June 21, 1938. R. F. BATH 2,121,380

BOTTOMING TAP

Filed Sept. 25, 1937

Inventor
Russell F. Bath
By attorney
Chas. T. Hawley

Patented June 21, 1938

2,121,380

UNITED STATES PATENT OFFICE 2,121,380

BOTTOMING TAP

Russell F. Bath, Shrewsbury, Mass., assignor to John Bath & Company, Worcester, Mass., a corporation of Massachusetts Application September 25, 1937, Serial No. 165,726

5 Claims. (Cl. 10—141)

This invention relates to taps for threading holes in metal, and relates more particularly to taps for threading holes which do not extend entirely through the element to be tapped, or in other words, for threading holes which are closed at the bottom.

A tap for threading such closed-bottom holes is termed a "bottoming tap" and is intended to cut a thread as close as possible to the bottom or end of the hole. Satisfactory operation of such taps is often prevented, however, by the accumulation of chips in the bottom of the hole, which chips prevent full entrance of the tap until after the tap is withdrawn and the chips are removed. Consequently, a substantially full length thread cannot be produced at a single threading operation.

It is the general object of my invention to provide an improved construction in a bottoming tap by which the chips will be directed rearward and outward along the grooves of the tap, rather than forward and inward to accumulate in the bottom of the hole. The hole is thus kept clear of chips in front of the tap, and the tap can thread the hole substantially to the bottom thereof.

My invention further relates to arrangements and combinations of parts which will be hereinafter described and more particularly pointed out in the appended claims.

A preferred form of the invention is shown in the drawing, in which

Figure 1:
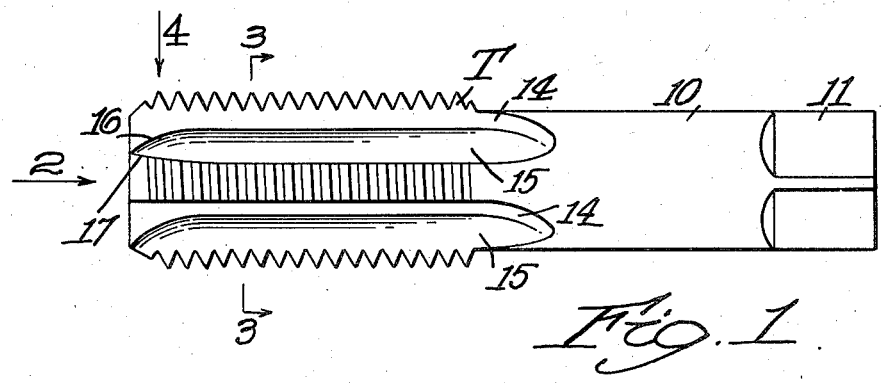
Fig. 1 is a side elevation of a tap embodying my improvements.
Figure 2:
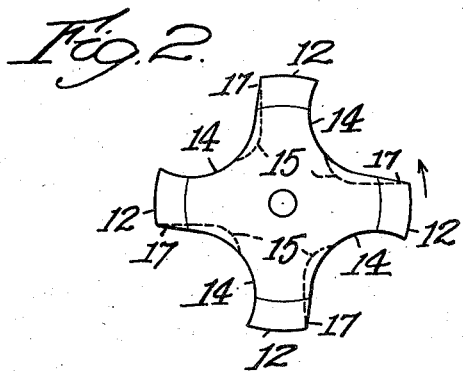
Fig. 2 is an end view of the tap.
Figure 3:
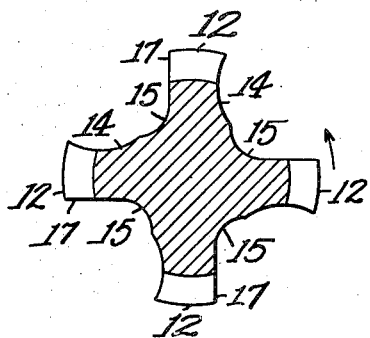
Fig. 3 is a sectional elevation, taken along the line 3—3 in Fig. 1.
Figure 4:
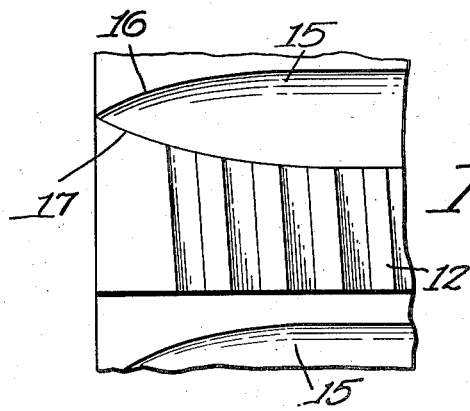
Fig. 4 is an enlarged partial plan view, looking in the direction of the arrow 4 in Fig. 1.

Referring to the drawing, I have shown my invention embodied in a four-flute bottoming tap for cutting V threads, but it will be understood that my invention is equally applicable to taps having any number of flutes and any desired form of thread.

The tap T shown in the drawing comprises a shank portion 10 having a squared end portion 11 to receive a wrench or to be held in a dog or chuck. The tap T is provided with threaded lands 12, separated by axially extending grooves 14.

In the preferred manner of forming my improved tap, I first provide the regular grooves 14 in the usual manner, these grooves extending full width to the extreme end of the tap. I then grind an auxiliary groove or recess 15 at the side of each groove 14, thereby setting back the cutting edge of each land 12 in the body portion of the tap. These auxiliary grooves 15, however, do not extend to the extreme end of the tap but have a tapered termination as they approach the end of the tap, as indicated at 16 in Fig. 1.

In grinding the auxiliary grooves, the cutting edges of the teeth in the body portion of each land 12 are set back a substantial distance from their original cutting position, as stated, but the original cutting edges of the teeth 17 at the end of the tap are decreasingly cut away, so that the extreme end teeth are practically untouched.

Consequently the end teeth 17 of the tap in effect have their cutting edges projected forward with respect to the cutting edges of the teeth in the body of the tap, and these end cutting edges are also beveled or inclined in such a direction that they direct the chips into the grooves 14 and along the grooves toward the shank of the tap.

Accumulation of chips in front of the tap is thus prevented, which makes it possible to insert my improved tap substantially to the bottom of a hole, thus giving a maximum length of available threads.

While I have described a convenient manner of producing my improved bottoming tap, my invention is not restricted to any specific method of manufacture, as a tap having the improved cutting characteristics herein described might be produced by other methods of manufacture.

The essential feature of the invention is the provision of teeth at the extreme end of a tap which have cutting edges so beveled or inclined as to direct the chips away from the end of the tap and into the longitudinal grooves thereof.

Having thus described my invention and the advantages thereof, I do not wish to be limited to the details herein disclosed, otherwise than as set forth in the claims, but what I claim is:

1. A bottoming tap having cutting teeth arranged in a plurality of axially extending lands separated by axial clearance grooves and having the first few teeth adjacent the entering end of the tap provided with cutting edges substantially angularly disposed with respect to the thread helix and effective to direct chips along the clearance grooves and away from said entering end.

2. A bottoming tap having cutting teeth arranged in a plurality of axially extending lands separated by axial clearance grooves, the cutting edges of the first few teeth adjacent the entering end of the tap being sharply advanced in the direction of cutting movement with respect to the cutting edges of the remaining teeth.

3. A bottoming tap having cutting teeth arranged in a plurality of axially extending lands separated by axial clearance grooves, the cutting edges of the first few teeth adjacent the entering end of the tap being substantially backwardly beveled away from said entering end, whereby chips are directed backward along the clearance grooves.

4. A bottoming tap having cutting teeth arranged in a plurality of axially extending lands separated by axial clearance grooves, the cutting edges of the first few teeth adjacent the entering end of the tap being sharply advanced in the direction of cutting movement with respect to the cutting edges of the remaining teeth and the cutting edges of said end teeth being also substantially backwardly beveled away from said entering end, whereby chips are directed backward along the clearance grooves.

5. A bottoming tap having cutting teeth arranged in a plurality of axially extending lands separated by axial clearance grooves extending the full length of the threaded portion of the tap and having an auxiliary axially extending groove at one side of each clearance groove and terminating just short of the entering end of said tap.

RUSSELL F. BATH.